(12) United States Patent
Sueoka et al.

(10) Patent No.: US 9,804,056 B2
(45) Date of Patent: Oct. 31, 2017

(54) TESTING UNIT FOR TESTING A MULTI-CYLINDER ENGINE

(71) Applicant: HIRATA CORPORATION, Tokyo (JP)

(72) Inventors: Hisayuki Sueoka, Tokyo (JP); Tsuyoshi Uchida, Tokyo (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 274 days.

(21) Appl. No.: 14/670,052

(22) Filed: Mar. 26, 2015

(65) Prior Publication Data

US 2015/0276551 A1 Oct. 1, 2015

(30) Foreign Application Priority Data

Mar. 27, 2014 (JP) .................................. 2014-066733

(51) Int. Cl.
| | |
|---|---|
| G01M 15/02 | (2006.01) |
| G01M 15/09 | (2006.01) |
| G01M 15/08 | (2006.01) |
| G01M 15/05 | (2006.01) |
| G01M 15/10 | (2006.01) |

(52) U.S. Cl.
CPC ............ G01M 15/09 (2013.01); G01M 15/05 (2013.01); G01M 15/08 (2013.01); G01M 15/106 (2013.01)

(58) Field of Classification Search
USPC ............... 73/114.31, 114.32, 114.33, 114.37, 73/114.69, 116.02, 118.02
See application file for complete search history.

(56) References Cited

U.S. PATENT DOCUMENTS

| | | | |
|---|---|---|---|
| 5,417,109 | A | 5/1995 | Scourtes |
| 5,473,970 | A | 12/1995 | Hayashi et al. |
| 5,492,006 | A | 2/1996 | Beckett |
| 6,481,269 | B2 | 11/2002 | Maruta et al. |

(Continued)

FOREIGN PATENT DOCUMENTS

| | | |
|---|---|---|
| CN | 102022142 A | 4/2011 |
| CN | 102149902 A | 8/2011 |

(Continued)

OTHER PUBLICATIONS

The extended European Search Report dated Aug. 24, 2015, by the European Patent Office in corresponding European Patent Application No. 15000906.6-1557 (7 pgs).

(Continued)

*Primary Examiner* — Eric S McCall
(74) *Attorney, Agent, or Firm* — Buchanan Ingersoll & Rooney PC

(57) ABSTRACT

The present invention provides a testing device testing a multi-cylinder engine including a plurality of ports including an intake port and an exhaust port in a pseudo driving state. The device includes a plurality of pressure inspection units and at least one opening/closing mechanism. Each of the plurality of pressure inspection units includes a pipeline connected to one of the plurality of ports, a sensor for detecting a pressure in the pipeline and a valve for opening/closing the pipeline. The opening/closing mechanism includes one actuator and a transmission mechanism connected to the actuator and transmitting a driving force of the actuator to an operation unit of each of the plurality of valves to open and close the plurality of valves.

8 Claims, 8 Drawing Sheets

(56) References Cited

U.S. PATENT DOCUMENTS

| | | |
|---|---|---|
| 6,711,944 B2 | 3/2004 | Maruta et al. |
| 7,849,734 B2 | 12/2010 | Moritani et al. |
| 8,316,699 B2 | 11/2012 | Sueoka et al. |

FOREIGN PATENT DOCUMENTS

| | | |
|---|---|---|
| EP | 1 693 661 A1 | 8/2006 |
| JP | H05-071250 U | 9/1993 |
| JP | H06-26995 A | 2/1994 |
| JP | H10-153528 A | 6/1998 |
| JP | H11-22954 A | 1/1999 |
| JP | 2005-120839 A | 5/2005 |
| JP | 4315957 B2 | 8/2009 |

OTHER PUBLICATIONS

Office Action dated Mar. 15, 2017, by the State Intellectual Property Office of China in corresponding Chinese Patent Application No. 201510140473.6. (6 pages).

Office Action dated Sep. 15, 2017 issued in the Japanese Patent Office in corresponding Japanese Patent Application No. 2014-066733 and English language translation (7 pages).

F I G. 4
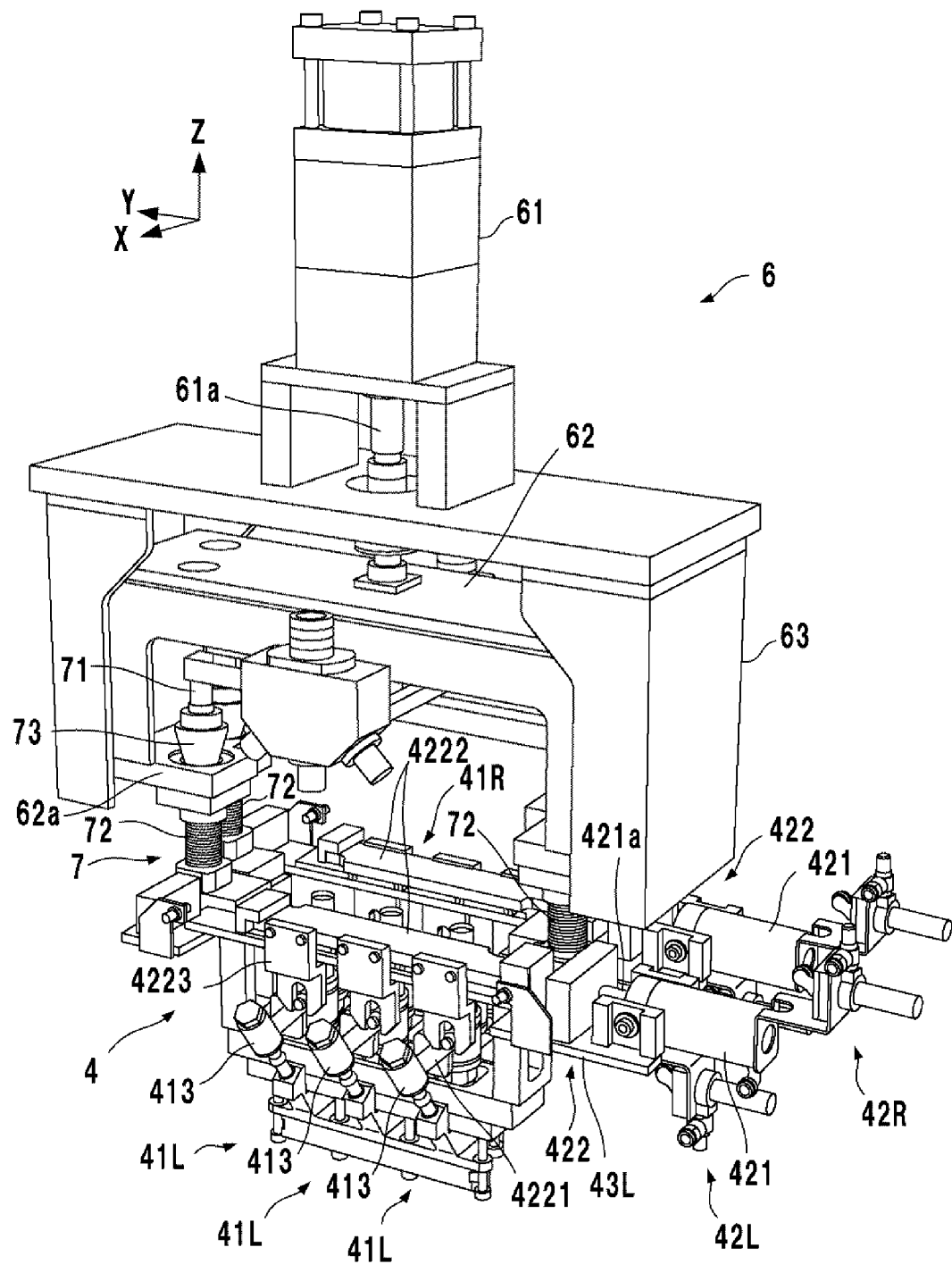

TESTING UNIT FOR TESTING A MULTI-CYLINDER ENGINE

BACKGROUND OF THE INVENTION

Field of the Invention

The present invention relates to a testing device and a testing unit of an engine.

Description of the Related Art

A device for conducting a test without combustion of fuel is proposed as a testing device of an engine. Japanese Patent No. 4315957, for example, discloses a device for measuring pressure fluctuation of an intake port or an exhaust port by rotating a crank shaft by an electric motor.

A unit for measuring pressure fluctuation of the intake port and the exhaust port is generally provided with a pipeline connected to the ports, a sensor for detecting a pressure inside the pipeline, and a pipeline valve for opening/closing the pipeline. As a test example, there is a test for checking whether or not responsiveness of the intake/exhaust valve is within a reference value in an overlap zone of the intake/exhaust valve, for example. In this case, a pipeline on an intake side is opened, while the pipeline on the exhaust side is closed, and pressure fluctuation on the intake side is measured. To the contrary, a pipeline on the exhaust side is opened, while the pipeline on the intake side is closed, and pressure fluctuation on the exhaust side is measured.

From the viewpoint of measurement accuracy of pressure fluctuation, a capacity inside the pipeline from the port to the pipeline valve is preferably small. If the capacity in the pipeline is large, responsiveness of pressure fluctuation lowers. Thus, a pipeline length from the port to the pipeline valve is preferably small.

On the other hand, a valve with actuator such as an air cylinder is used as the pipeline valve in terms of automation of opening/closing of the valve through automatic control. However, the valve with actuator requires an arrangement space for an actuator and has limitation in reduction of the pipeline length.

SUMMARY OF THE INVENTION

The present invention has an object to realize automation of opening/closing of the valve and to further reduce the pipeline length.

According to an aspect of the present invention, there is provided a testing device configured to test a multi-cylinder engine including a plurality of ports including an intake port and an exhaust port in a pseudo driving state, comprising: a plurality of pressure inspection units; and at least one opening/closing mechanism, wherein each of the plurality of pressure inspection units includes: a pipeline connected to one of the plurality of ports; a sensor for detecting a pressure in the pipeline; and a valve for opening/closing the pipeline, and wherein the opening/closing mechanism includes: one actuator; and a transmission mechanism connected to the actuator and transmitting a driving force of the actuator to an operation unit of each of the plurality of valves to open and close the plurality of valves.

According to another aspect of the present invention, there is provided a testing unit configured to test a multi-cylinder engine provided with a plurality of ports including an intake port and an exhaust port in a pseudo driving state, comprising: a plurality of pressure inspection units; and at least one opening/closing mechanism, wherein each of the plurality of pressure inspection units includes: a pipeline connected to one of the plurality of ports; and a valve for opening/closing the pipeline, wherein the pipeline includes a mounting unit to which a sensor for detecting a pressure in the pipeline is mounted; and wherein the opening/closing mechanism includes: one actuator; and a transmission mechanism connected to the actuator and transmitting a driving force of the actuator to an operation unit of each of the plurality of valves to open and close the plurality of valves.

Further features of the present invention will become apparent from the following description of exemplary embodiments (with reference to the attached drawings).

BRIEF DESCRIPTION OF THE DRAWINGS

FIG. 4 is a perspective view of a testing unit and a moving mechanism;

DESCRIPTION OF THE EMBODIMENTS

An embodiment of the present invention will be described below. In each figure, an arrow Z indicates a vertical direction, and arrows X and Y indicate horizontal directions orthogonal to each other.

Figure 1:
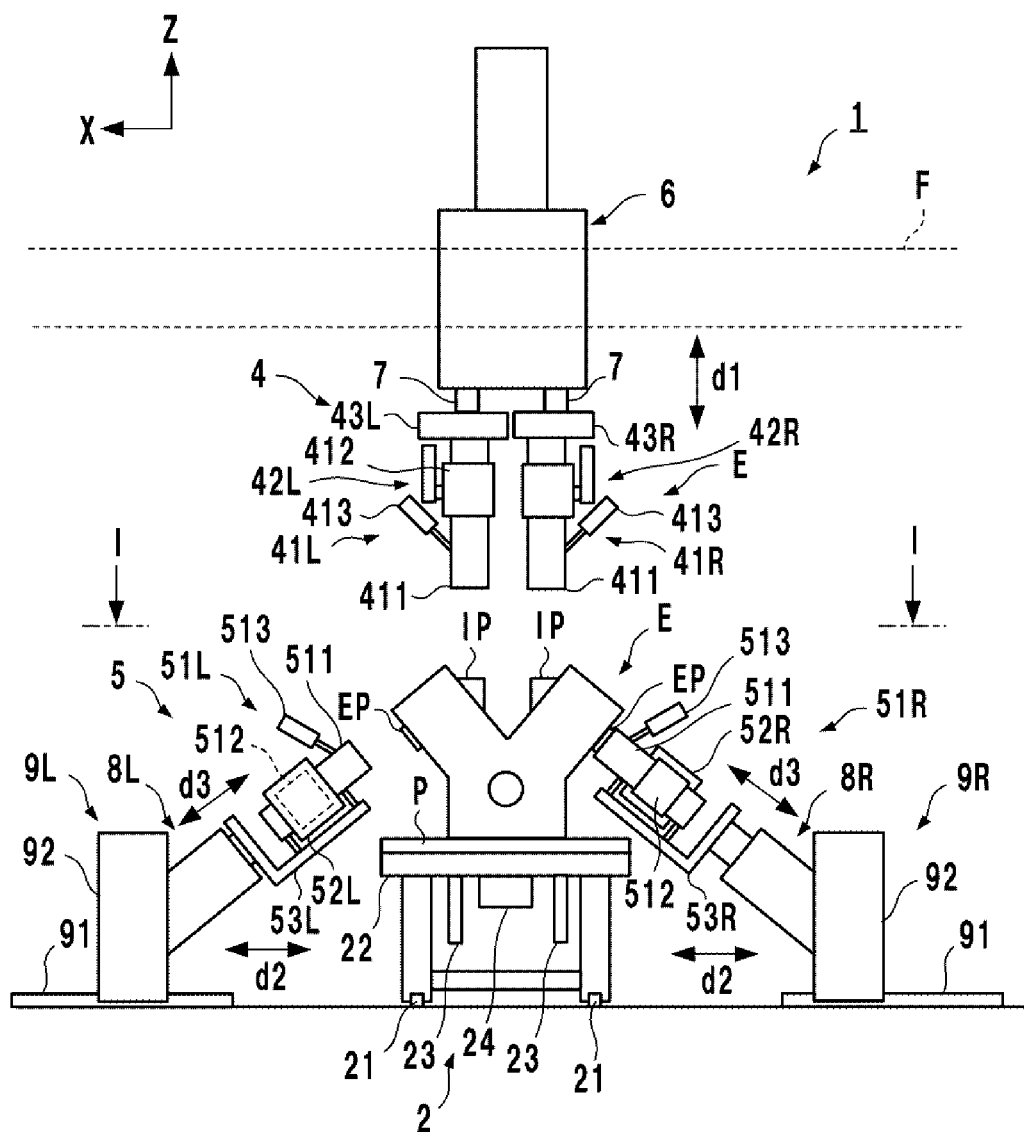
FIG. 1 is a schematic view of a testing device according to an embodiment of the present invention.
Figure 2:
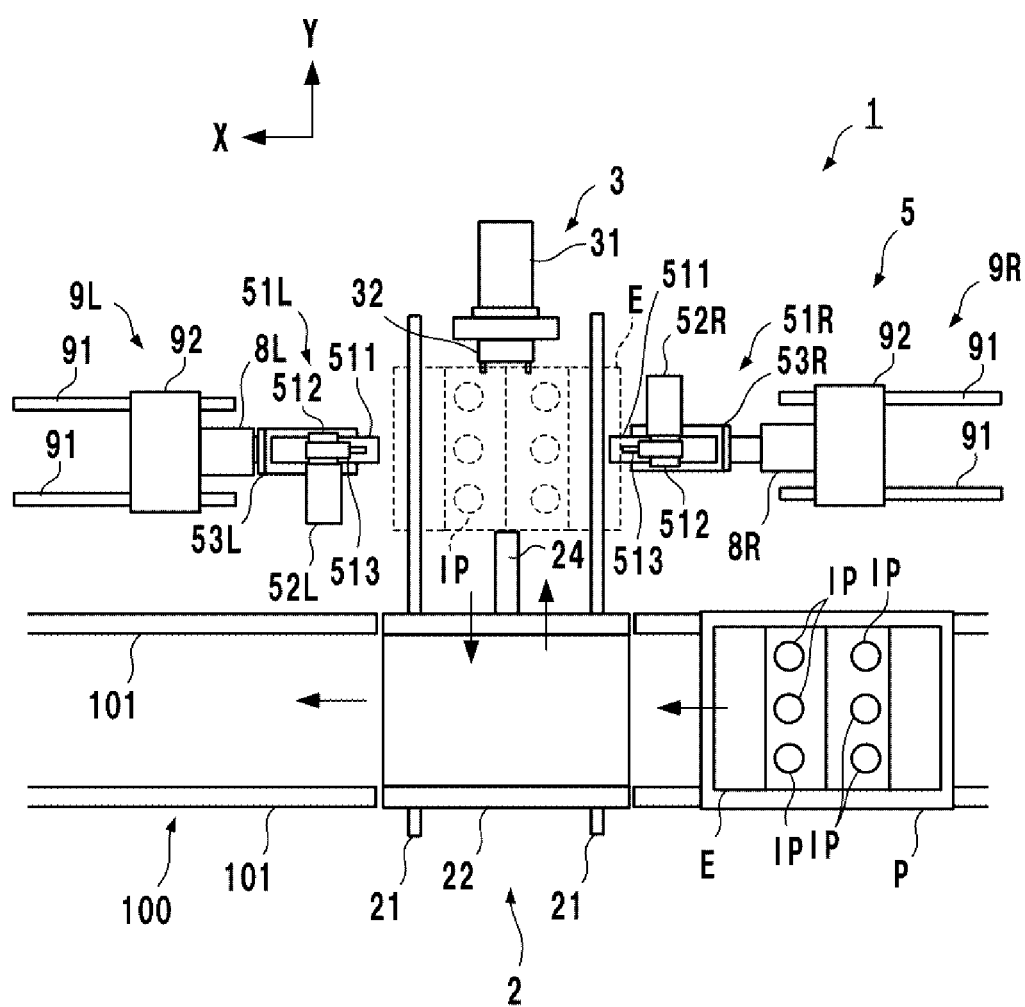
FIG. 2 is an I-I line arrow view of FIG. 1.

FIG. 1 is a schematic view of a testing device 1 according to an embodiment of the present invention, and FIG. 2 is an I-I line arrow view of FIG. 1. Assuming that FIG. 1 is a front view of the testing device 1, FIG. 2 corresponds to a plan view excluding a part of the configuration of the testing device 1. In FIG. 1, a specific configuration of a conveying device 100 is omitted.

The testing device 1 takes in an engine E conveyed in an X-direction by the conveying device 100 which may be a roller conveyer or the like, conducts a test and returns the engine E to the conveying device 100 again after the test. The test conducted by the testing device 1 for the engine E is a test conducted in a pseudo driving state without combustion of fuel, and this is a device for conducting a so-called cold test.

The engine E is a multi-cylinder engine. The multi-cylinder engine to which the present invention can be applied is assumed to be a V-type 6-cylinder engine in this embodiment, though the number of cylinders and cylinder arrangement are not particularly limited. The engine E has its cylinder row direction in the Y-direction, in which three cylinders each are arranged on one bank. One intake port IP is provided in each cylinder independently, and six intake ports IP in total are arranged between the banks. In a case of this embodiment, an exhaust port EP is a collective exhaust port and provided one port on each bank totaling in two ports. It is needless to say that the present invention can be also applied to a case in which the exhaust port EP is constituted one for each cylinder independently.

<Configuration of Testing Device>

The testing device 1 includes a conveying mechanism 2, a driving unit 3, testing units 4 and 5, a moving mechanism 6, a buffer mechanism 7, and moving mechanisms 8L, 8R, 9L, and 9R. Reference character L at the end of reference numeral indicates a configuration corresponding to a test on the left bank when seen in FIG. 1, while reference character R indicates a configuration corresponding to a test on the right bank when seen in FIG. 1 or FIG. 2. These reference characters L and R are omitted in some cases when these configurations do not have to be distinguished. For example, when the moving mechanism 8L and the moving mechanism 8R are not distinguished, they are indicated simply as the moving mechanism 8 in some cases.

The conveying mechanism 2 is constituted by the conveying device 100 for conveying a pallet P on which the engine E is mounted in the X-direction and a mechanism for taking in the engine E (mounted on the pallet P) conveyed by the conveying device 100 into the testing device 1 or returning the engine E after the test has been completed to the conveying device 100, that is, a movable conveying unit 22. The conveying device 100 is constituted by a pair of roller conveyers 101 extended in the X-direction and is provided with a stop device for positioning a work at a predetermined position. The movable conveying unit 22 includes an elevation unit 23 for elevating up/down the pallet P, a pair of guide rollers 21 extended in the Y-direction, a slider (not shown) movable along the guide rollers 21, and a driving unit 24 for driving the slider in the Y-direction. As the driving unit 24, a known linear driving unit such as a boll screw unit, a linear motor unit and the like, for example, can be cited. A free roller can be cited as the guide rollers 21, for example.

The engine E to be tested is mounted on the pallet P and conveyed on the conveying device 100. When the pallet P on which the engine E is mounted reaches onto the movable conveying unit 22, the pallet P is positioned at a predetermined position and fixed by the stop device. After that, as the slider is slid by the driving unit 24 to an engagement position with the pallet P, the pallet P is raised by the elevation unit 23. As a result, the pallet P sinks into a lower recessed portion of the slider and is coupled with the pallet P. After that, the slider is slid to the testing device 1 side by the driving unit 24.

The slider conveys the engine E with the pallet P to a test position (a position of the engine E indicated by a broken line in FIG. 2) and stands by during the test. After the test is finished, the slider is slid by the driving unit 24 again to the pallet P side, transfers the pallet P to the conveying device 100 and conveys it. In this way, the continuous testing of the engine E is made possible.

The driving unit 3 includes a driving source 31 such as an electric motor or the like and a chuck 32 rotated by the driving source 31. When the engine E reaches the test position, a crank shaft of the engine E and the driving source 31 are coupled by the chuck 32. As the driving source 31 is driven, the crank shaft is rotated, and the engine E can be brought into a pseudo driving state.

Testing units 4 and 5 are units for measuring pressure fluctuation of the intake port IP and the exhaust port EP when the engine E is brought into the pseudo driving state.

The testing unit 4 includes a plurality of pressure inspection units 41L (details will be described later) corresponding to the three intake ports IP on the left bank, one opening/closing mechanism 42L, one support unit 43L, a plurality of pressure inspection units 41R corresponding to the three intake ports IP on the right bank, one opening/closing mechanism 42R, and one support unit 43R as illustrated in FIG. 1.

The testing unit 5 includes one pressure inspection unit 51L (details will be described later) corresponding to the one exhaust port EP on the left bank when seen in FIG. 1, one opening/closing mechanism 52L, one support unit 53L, one pressure inspection unit 51R corresponding to the one exhaust port EP on the right bank, one opening/closing mechanism 52R, and one support unit 53R.

The moving mechanism 6 moves the testing unit 4 through the buffer mechanism 7. In this embodiment, an example of arrangement in which the intake port IP is opened substantially upward on an upper part of the engine E is used as an example. Thus, in this embodiment, the moving mechanism 6 is an elevation mechanism for elevating up/down the testing unit 4 as indicated by an arrow d1 in FIG. 1 and moves the testing unit 4 between an inspection position and a retreated position. The inspection position is a position where a pipeline 411 provided in a pressure inspection unit 41 is connected to the intake port IP, while the retreated position is a position where the pipeline 411 is spaced away from the intake port IP. When the engine E is taken into the testing device 1 from the conveying device 100, the testing unit 4 is moved to the retreated position, and an accommodation space of the engine E is ensured. When a test is to be conducted, the testing unit 4 is moved to the inspection position, and the pipeline 411 is connected to the intake port IP.

The moving mechanisms 8L and 9L are mechanisms for moving the support unit 53L, and the moving mechanisms 8R and 9R are mechanisms for moving the support unit 53R. The pressure inspection unit 51 and the opening/closing mechanism 52 are mounted on the support unit 53. The moving mechanisms 8 and 9 move the pressure inspection unit 51 and the opening/closing mechanism 52 between the inspection position and the retreated position by moving the support unit 53. FIGS. 1 and 2 exemplify a case in which the pressure inspection unit 51L is at the retreated position and the pressure inspection unit 51R is at the inspection position. The inspection position is a position where a tip end of a pipeline 511 provided in the pressure inspection unit 51 is connected to the exhaust port EP, and the retreated position is a position where the pipeline 511 is spaced away from the exhaust port EP.

The exhaust port EP is opened in an outer wall of the bank, and the outer wall is inclined diagonally downward. The moving mechanism 8 advances/retreats the support unit 53 in a direction substantially orthogonal to the outer wall of the bank as indicated by an arrow d3. The moving mechanism 9 includes a pair of rails 91 extended in the X-direction and a slider 92 moving by being guided by the rails 91. The moving mechanism 8 is mounted on the slider 92 and is moved by the moving mechanism 9 in the X-direction. That is, the support unit 53 is moved in two directions, that is, in the X-direction and a diagonal direction.

The moving mechanism 8 can be constituted by an air cylinder or an electric cylinder, for example. The moving mechanism 9 can be constituted by a driving source such as a motor and the like and a transmission mechanism (a belt transmission mechanism, a ball-screw mechanism, a rack-pinion mechanism and the like, for example) for transmitting a driving force of the driving source, for example. The moving mechanism 9 may be constituted by an air cylinder, an electric cylinder or the like.

<Pressure Inspection Unit>

Figure 3:
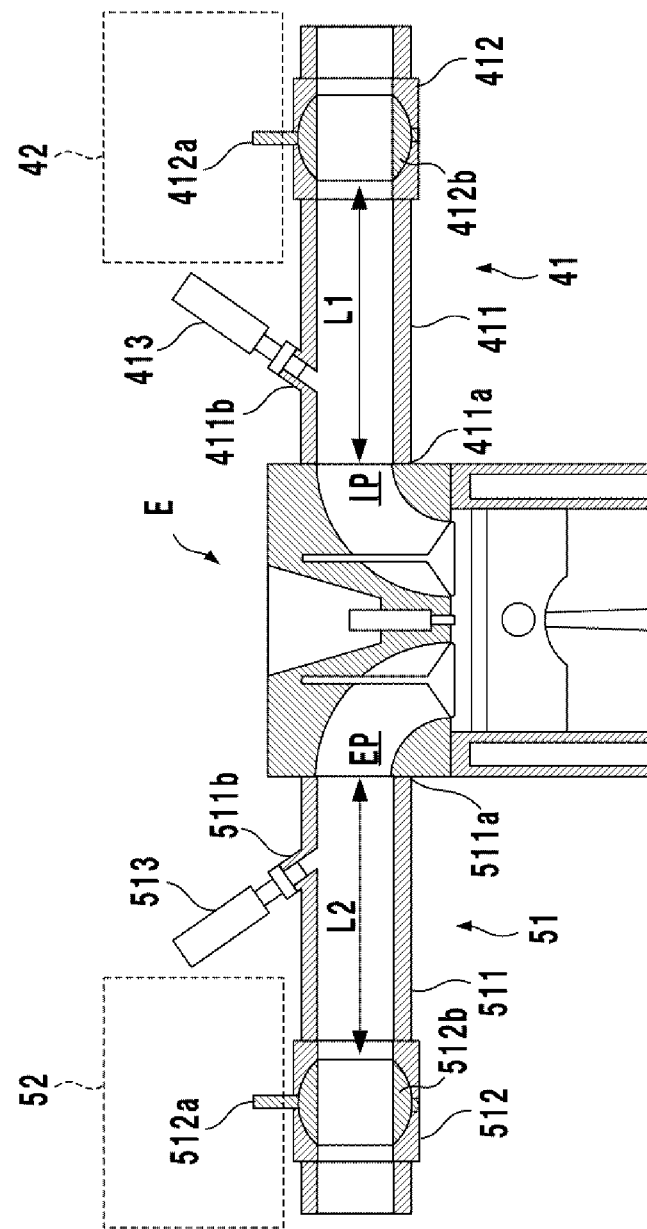
FIG. 3 is an explanatory view of a pressure inspection unit.

The pressure inspection units 41 and 51 and prior-art problems will be described by referring to FIG. 3. The same figure illustrates a state at the test by using the pressure inspection units 41 and 51, and the pressure inspection units 41 and 51 are located at the inspection position. In this embodiment, as described above, it is assumed that the exhaust port EP is a collective exhaust port, but for simplification of explanation, it is illustrated as an exhaust port for each cylinder in FIG. 3.

The pressure inspection unit 41 is provided one each for the intake port IP. In this embodiment, since six intake ports IP are provided, the pressure inspection units 41 are provided in number of six. The pressure inspection unit 41 includes the pipeline 411, a valve 412, and a pressure sensor 413.

The pipeline 411 is connected to the intake port IP and its internal space communicates with the intake port IP. The pipeline 411 is constituted by a metal cylindrical member, for example, and a seal material such as rubber or the like may be provided at its tip end portion 411a so that it is brought into airtight close contact with an opening peripheral edge of the intake port IP.

A mounting unit 411b on which the pressure sensor 413 is mounted is provided on a peripheral wall of the pipeline 411. The mounting unit 411b is formed at a position between the intake port IP and the valve 412. The mounting unit 411b is provided by forming a through hole communicating with the internal space of the pipeline 411 in a boss unit where the pressure sensor 413 is fixed by a screw or the like, and a detection unit of the pressure sensor 413 is air-tightly inserted into this through hole. The pressure sensor 413 is a sensor for measuring an air pressure and detects a pressure of the internal space of the pipeline 411.

A section opening of the pipeline 411 is opened/closed by opening/closing the valve 412. When it is opened, the intake port IP is brought into a communication state with the ambient air, while when it is closed, the intake port IP is brought into a non-communication state with the ambient air. In this embodiment, the valve 412 is assumed to be a ball valve. The valve 412 includes an operation unit 412a and a spherical valve element 412b. In this embodiment, the operation unit 412a is a valve shaft connected to the valve element 412b, and the valve element 412b is rotated by rotating the operation unit 412a around the shaft so that the valve 412 is opened/closed. Rotation ranges of the operation unit 412a and the valve element 412b are assumed to be 90 degrees, and by rotating the operation unit 412a by 90 degrees, the valve element 412b can be switched between an open state and a closed state. The rotation of the operation unit 412a is performed by the opening/closing mechanism 42 connected to the operation unit 412a. By driving this opening/closing mechanism 42, the operation unit 412a is rotated, and the valve 412 is opened/closed. The opening/closing mechanism 42 is as will be described later.

The pressure inspection unit 51 is provided one each for each exhaust port EP. In this embodiment, two exhaust ports EP are provided and thus, two pressure inspection units 51 are provided. The pressure inspection units 51 have a configuration similar to that of the pressure inspection unit 41.

The pressure inspection unit 51 includes a pipeline 511, a valve 512, and a pressure sensor 513. The pipeline 511 is connected to the exhaust port EP and its internal space communicates with the exhaust port EP. The pipeline 511 is constituted by a metal cylindrical member, for example, and its tip end portion 511a can be constituted by a seal material such as rubber or the like so that it is brought into airtight close contact with an opening peripheral edge of the exhaust port EP.

A mounting unit 511b on which the pressure sensor 513 is mounted is provided on a peripheral wall of the pipeline 511. The mounting unit 511b is formed at a position between the exhaust port EP and the valve 512. The mounting unit 511b is provided by forming a through hole communicating with the internal space of the pipeline 511 in a boss unit where the pressure sensor 513 is fixed by a screw or the like, and a detection unit of the pressure sensor 513 is air-tightly inserted into this through hole. The pressure sensor 513 is a sensor for measuring an air pressure and detects a pressure of the internal space of the pipeline 511.

A section opening of the pipeline 511 is opened/closed by opening/closing the valve 512. When it is opened, the exhaust port EP is brought into a communication state with the ambient air, while when it is closed, the exhaust port EP is brought into a non-communication state with the ambient air. In this embodiment, the valve 512 is assumed to be a ball valve. The valve 512 includes an operation unit 512a and a spherical valve element 512b. In this embodiment, the operation unit 512a is a valve shaft connected to the valve element 512b, and the valve element 512b is rotated by rotating the operation unit 512a around the shaft so that the valve 512 is opened/closed. Rotation ranges of the operation unit 512a and the valve element 512b are assumed to be 90 degrees, and by rotating the operation unit 512a by 90 degrees, the valve element 512b can be switched between an open state and a closed state. The rotation of the operation unit 512a is performed by the opening/closing mechanism 52 connected to the operation unit 512a. By driving this opening/closing mechanism 52, the operation unit 512a is rotated, and the valve 512 is opened/closed. The opening/closing mechanism 52 is as will be described later.

In a test of the engine E, the valve 412 is set in an open state and the valve 512 in a closed state, for example, and the engine E is brought into a pseudo driving state by driving of the driving unit 3. Pressure fluctuation of the exhaust port EP is measured by the pressure sensor 513. Alternatively, the valve 412 is brought into the closed state and the valve 512 in the open state, for example, and the engine E is brought into the pseudo driving state by driving of the driving unit 3. The pressure fluctuation of the intake port IP is measured by the pressure sensor 413.

In order to measure the pressure fluctuation of each port more instantaneously, a higher pressure is required, and this depends on the capacity in each port and the capacities of the internal spaces of the pipelines 411 and 511. It is effective that the capacities of the internal spaces of the pipelines 411 and 511 are made as small as possible. That is, it is effective that a pipeline length L1 from the intake port IP to the valve 412 and a pipeline length L2 from the exhaust port EP to the valve 512 are made shorter.

In order to make the pipeline lengths L1 and L2 shorter, the valves 412 and 512 need to be brought closer to the intake port IP and the exhaust port EP. However, there is the pressure sensor 413 between the valve 412 and the intake port IP, and an arrangement space for the opening/closing mechanism 42 also needs to be ensured. Similarly, there is the pressure sensor 513 between the valve 512 and the exhaust port EP, and an arrangement space for the opening/closing mechanism 52 also needs to be ensured.

The ball valve generally has small resistance in opening and high sealing performance in closing and is effective in this type of tests. However, since the sealing performance is high, an operation torque required for opening/closing is relatively high, and an actuator which is a driving source becomes large-sized. Moreover, the opening/closing mechanism 42 has a large operation torque and has a tendency that the torque becomes larger as its use frequency increases. Thus, the opening/closing mechanism 42 is a mechanism which is difficult to be made small-sized. Therefore, in a general configuration in which an actuator for opening/closing the ball valve is provided for each ball valve, a disposition space for the actuator needs to be ensured wide, and there is limitation to reduction of the pipeline lengths L1 and L2.

In this embodiment, the actuator is arranged away from the valve, and the driving force is transmitted through the transmission mechanism. As a result, automation of opening/closing of the valve can be realized, and the pipeline length can be reduced. A configuration on the intake side (the testing unit 4, the moving mechanism 6, and the buffer mechanism 7) will now be described mainly on the configuration of the opening/closing mechanism 42.

<Configuration of Intake Side>

Figure 5:
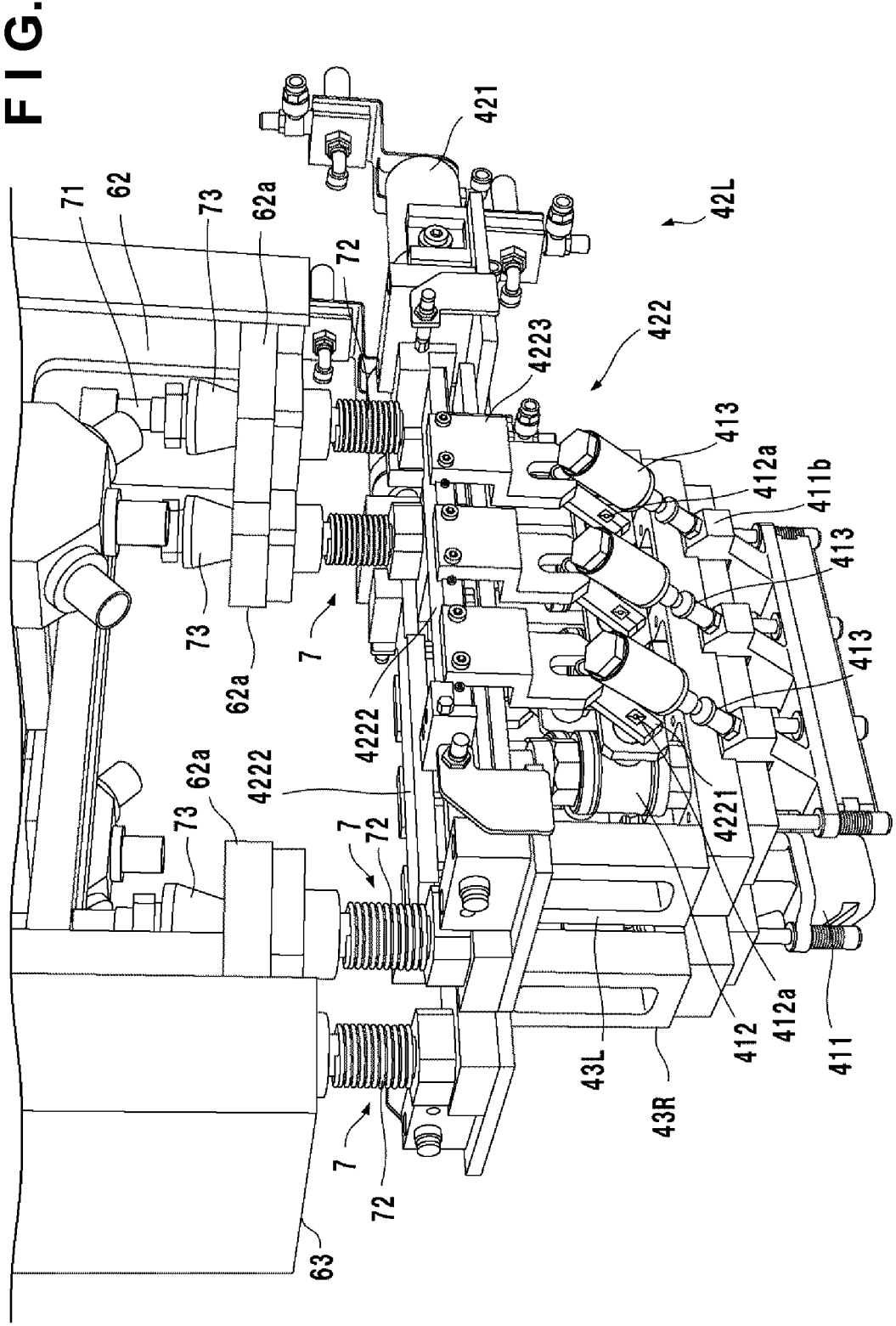
FIG. 5 is a perspective view of the testing unit and its periphery.
Figure 6:
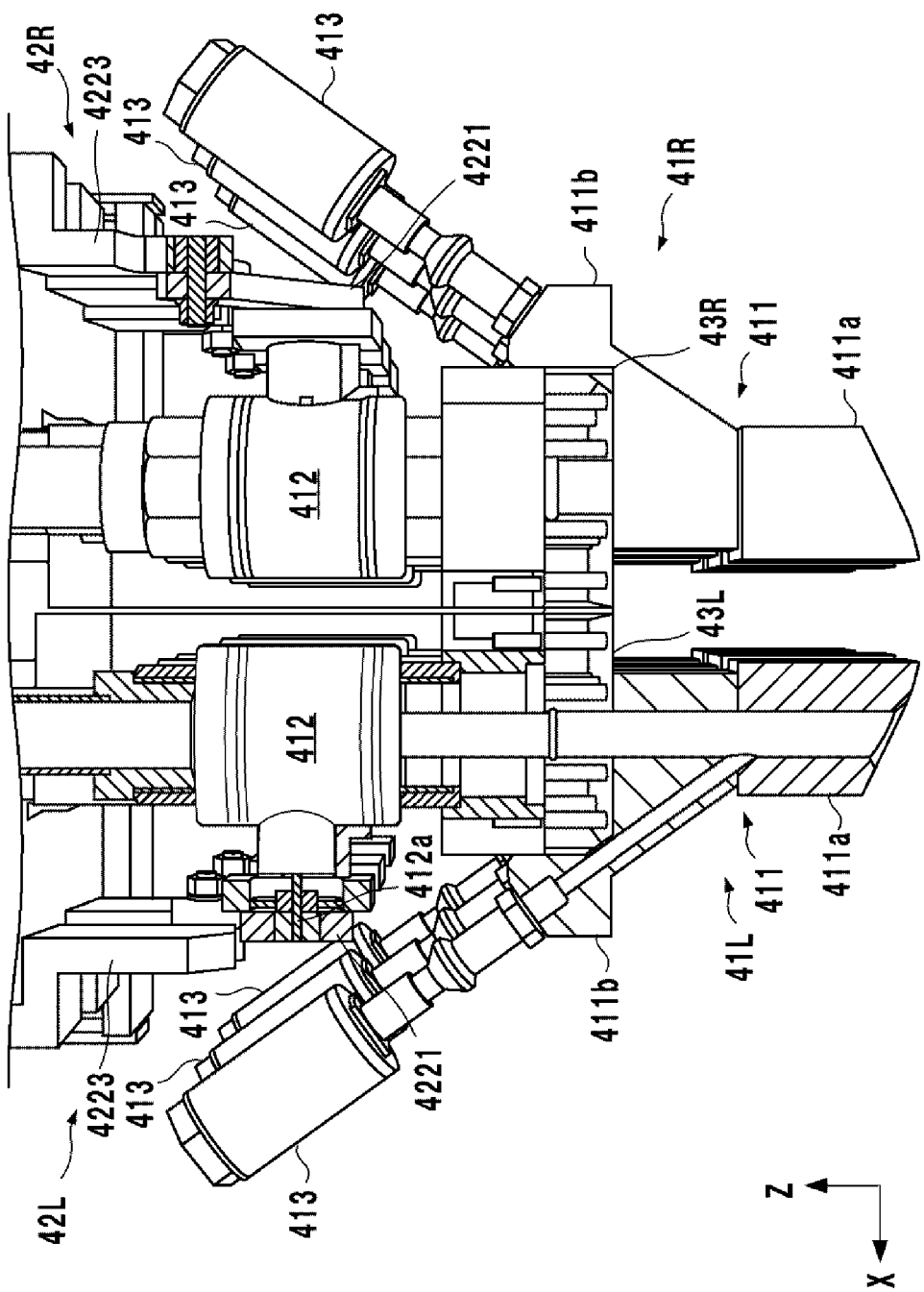
FIG. 6 is an explanatory view of a lower part of the testing unit.

By referring to FIGS. 1 and 4 to 6, the configurations of the testing unit 4, the moving mechanism 6, and the buffer mechanism 7 will be described. FIG. 4 is a perspective view of the testing unit 4 and the moving mechanism 6, and FIG. 5 is a perspective view of the testing unit 4 and its periphery. FIG. 6 is an explanatory view of a lower part of the testing unit 4 and is a partially cutaway view.

The moving mechanism 6 includes an actuator 61, an elevating body 62, and a support body 63. The actuator 61 is an electric cylinder or an air cylinder, for example, and elevates up/down the elevating body 62 by advancing/retreating a rod 61a. To the elevating body 62, the testing unit 4 is connected through the buffer mechanism 7. The testing unit 4 is suspended from the elevating body 62 through the buffer mechanism 7 and is raised or lowered by elevation of the elevating body 62. The support body 63 is fixed to a frame F (FIG. 1) constituting a framework of the testing device 1 and guides elevation of the elevating body 62.

The buffer mechanism 7 is provided between the support unit 43 of the testing unit 4 and the elevating body 62 of the moving mechanism 6 and connects these relative positions capable of displacement. In this embodiment, four buffer mechanisms 7 are provided, and two of them are provided between the support unit 43L and the elevating body 62, while the remaining two are provided between the support unit 43R and the elevating body 62. Therefore, the support unit 43R and the support unit 43L are capable of relative displacement in the Z-direction independently of each other with respect to the elevating body 62. The elevating body 62 includes four mounting units 62a on which the buffer mechanism 7 is mounted. The support unit 43L supports three pressure inspection units 41L and the opening/closing mechanism 42L. The support unit 43R supports three pressure inspection units 41R and the opening/closing mechanism 42R. The pressure inspection unit 41 and the opening/closing mechanism 42 are also elevated up/down by the elevation of the support unit 43.

The buffer mechanism 7 includes a rod 71, an elastic member 72, and a stopper 73. The rod 71 is a shaft extended in the Z-direction, and the support unit 43 is fixed to its lower end portion. An upper end portion of the rod 71 is connected to a part of the elevating body 62. A through hole into which the rod 71 is inserted is formed in the mounting unit 62a, and the rod 71 is inserted through this through hole and is extended to above the mounting unit 62a.

The stopper 73 is fixed to the rod 71 in a part above the mounting unit 62a. The stopper 73 regulates a maximum spaced distance of the support unit 43 with respect to the elevating body 62. That is, when the support unit 43 is lowered with respect to the elevating body 62, the rod 71 is also lowered with the support unit 43 but since the stopper 73 is engaged with the mounting unit 62a, lowering of the support unit 43 and the rod 71 is regulated.

The elastic member 72 is interposed between the mounting unit 62a and the support unit 43 and urges the elevating body 62 and the support unit 43 in a direction in which they are spaced away at all times. In this embodiment, the elastic member 72 is a coil spring, and the rod 71 is inserted through the elastic member 72.

When the testing unit 4 is to be moved to the inspection position, the moving mechanism 6 lowers the elevating body 62. In relation with arrangement of the intake port IP, as illustrated in FIG. 6, the pipeline 411 is extended in the Z-direction, and its tip end portion 411a is a lower end portion of the pipeline 411. When the tip end portion 411a of the pipeline 411 is brought into contact with the opening peripheral edge of the intake port IP, the testing unit 4 is capable of relative displacement in the Z-direction with respect to the elevating body 62. Thus, an impact when the tip end portion 411a and the opening peripheral edge of the intake port IP are brought into contact with each other is buffered. By urging of the elastic member 72, air tightness can be improved by pressing the tip end portion 411a onto the opening peripheral edge of the intake port IP.

In addition, since it is configured such that the testing unit 4 is connected to the elevating body 62 through the rod 71 and the stopper 73, when the testing unit 4 is to be replaced in association with a model change of the engine E, separation between the elevating body 62 and the testing unit 4 is facilitated, and a replacement work can be performed smoothly. By providing the elastic member 72, in a test operation of the testing unit 4 after replacement, a degree of a force in contact between the pipeline 411 and the opening peripheral edge of the intake port IP is automatically adjusted, and various operation settings required for the test can be facilitated. Such a buffer mechanism may be also provided between the testing unit 5 and the moving mechanism 8.

Figure 7:
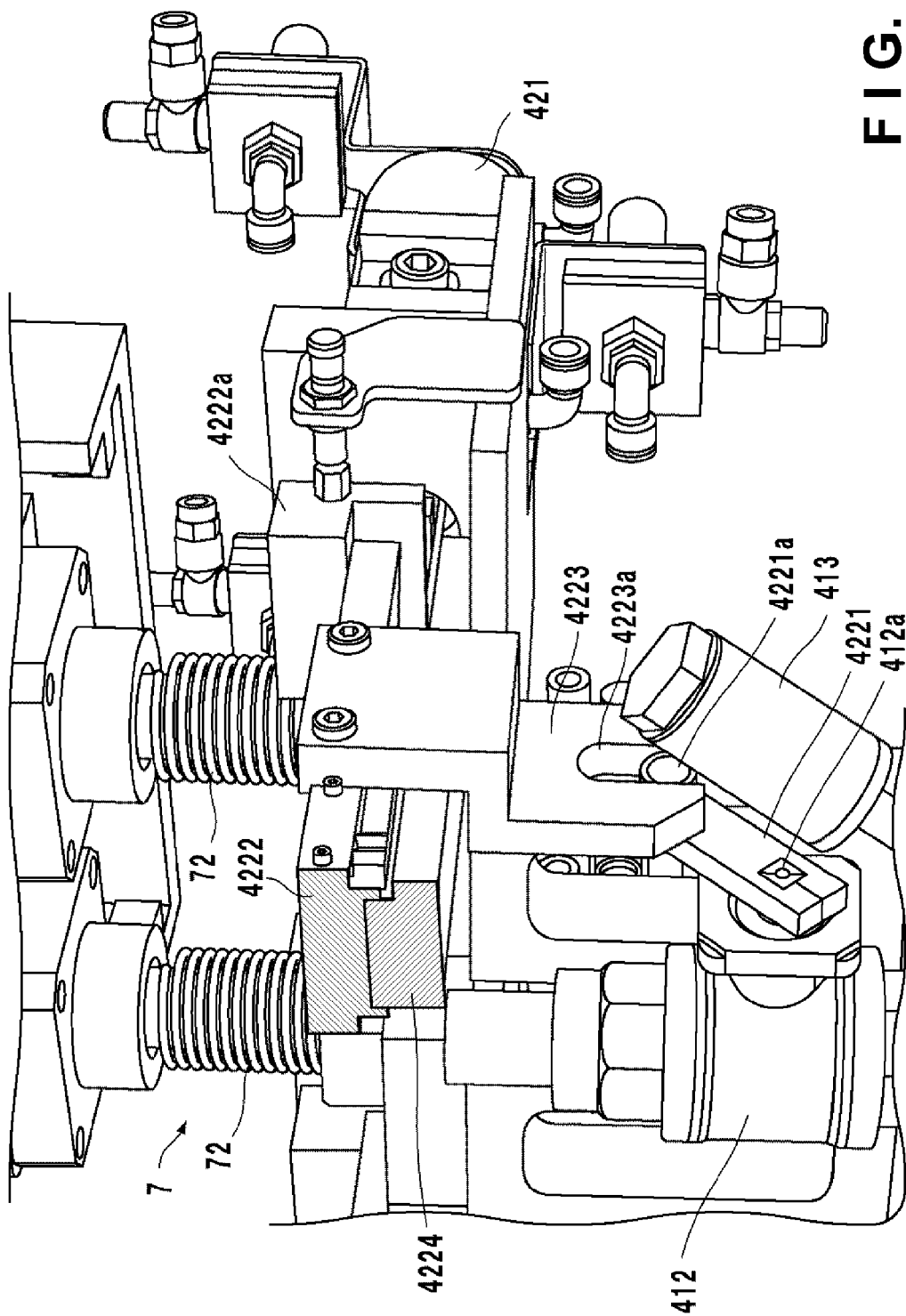
FIG. 7 is an explanatory view of the lower part of the testing unit.
Figure 8A:
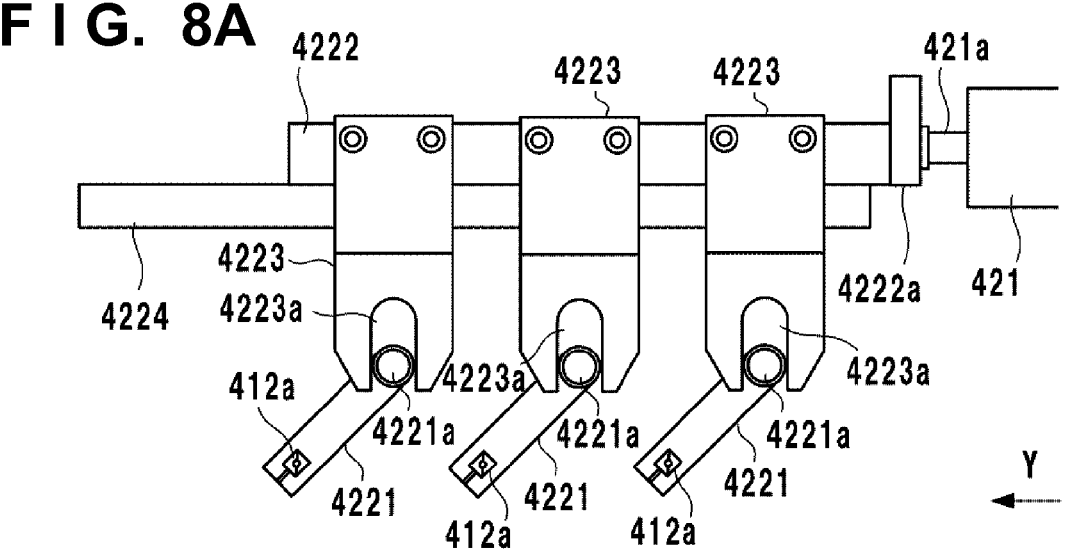
FIGS. 8A to 8C are operation explanatory views of an opening/closing mechanism.
Figure 8B:
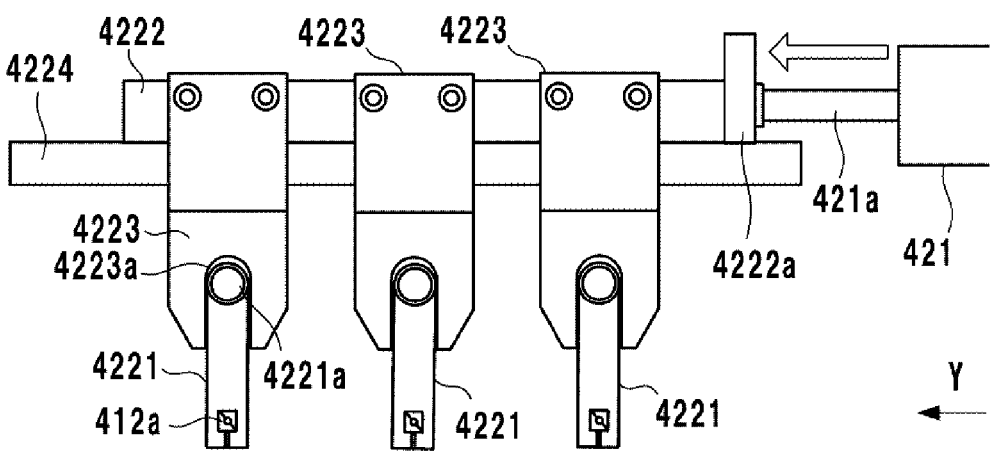
Figure 8C:
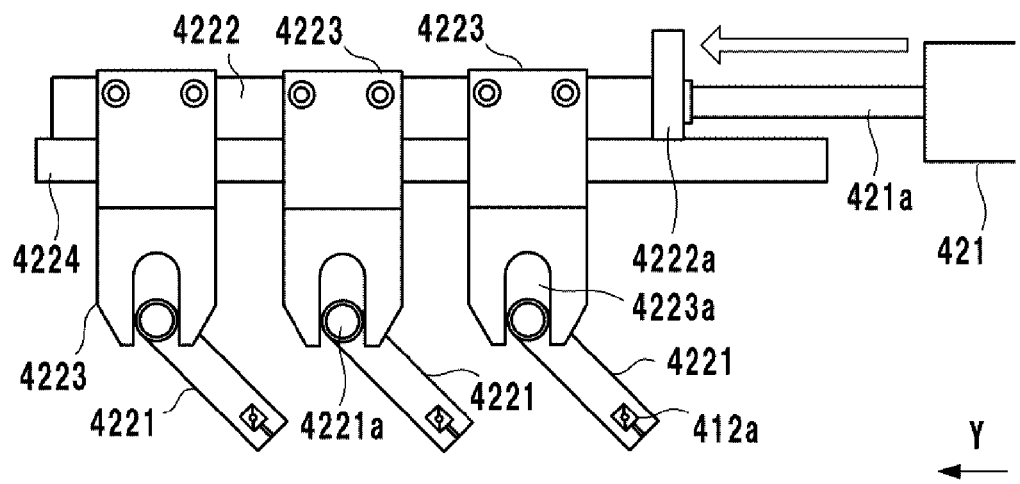

Next, a configuration of the opening/closing mechanism 42 will be described. In this embodiment, the opening/closing mechanism 42 is provided on each cylinder row (each one side of the banks) of the engine E. The opening/closing mechanism 42L corresponds to the left bank when seen in FIGS. 1 and 2, and the opening/closing mechanism 42R corresponds to the right bank. The opening/closing mechanism 42L and the opening/closing mechanism 42R have the similar configuration. By referring to FIGS. 4 to 8C, the configuration of the opening/closing mechanism 42 will be described below. FIG. 7 is an explanatory view of a lower part of the testing unit 4 and is a partially cutaway view of the opening/closing mechanism 42. FIGS. 8A to 8C are operation explanatory views of the opening/closing mechanism 42.

The opening/closing mechanism 42 includes an actuator 421 and a transmission mechanism 422. The actuator 421 outputs a driving force, and the transmission mechanism 422 is connected to the actuator 421 and transmits the driving force to each of the operation units 412a of the plurality of valves 412 (three valves 412 in this embodiment).

The actuator 421 is provided one each on one opening/closing mechanism 42. That is, the opening/closing mechanisms 42L and 42R include one actuator 421, respectively.

The actuator 421 is an air cylinder or an electric cylinder in this embodiment and is extended in a direction of a cylinder row (Y-direction) and includes a rod 421a advancing/retreating in the cylinder row direction (Y-direction). The actuator 421 is arranged on one end side of the testing unit 4 when seen in the cylinder row direction (Y-direction). In a relation with the pipeline 411, it is arranged away from the pipeline 411 on one end side in a disposition direction of the pipeline 411. In this embodiment as described above, the disposition space of the actuator 421 is configured not to affect the pipeline lengths L1 and L2 (FIG. 3).

The transmission mechanism 422 constitutes a link mechanism using the actuator 421 as a driving source in this embodiment. The transmission mechanism 422 includes a handle member 4221, a slide member 4222, a link member 4223, and a rail member 4224. The handle member 4221 and the link member 4223 are provided for each valve 412. Therefore, the handle members 4221 and the link members 4223 of the opening/closing mechanism 42L are provided in number of three, respectively, and the handle members 4221 and the link members 4223 of the opening/closing mechanism 42R are provided also in number of three, respectively.

The slide member 4222 and the rail member 4224 are provided one each on one opening/closing mechanism 42. Therefore, the numbers of the slide member 4222 and the rail member 4224 of the opening/closing mechanism 42L are one, respectively, and the numbers of the slide member 4222 and the rail member 4224 of the opening/closing mechanism 42R are one, respectively.

As illustrated in FIGS. 8A to 8C, the handle member 4221 is a plate-shaped member having its one end portion to which the operation unit 412a is connected and extending in a direction orthogonal to the axial direction of the operation unit 412a. By rotating the handle member 4221 around the axial direction of the operation unit 412a, the operation unit 412a is rotated, and the valve element 412b is rotated. On the other end portion of the handle member 4221, a columnar shaped engaging unit 4221a is provided. The engaging unit 4221a is a roller rotatably fixed to the handle member 4221, for example.

The slide member 4222 and the rail member 4224 are extended in the cylinder row direction (Y-direction). The rail member 4224 is supported by the support unit 43 and guides movement of the slide member 4222 in the cylinder row direction (Y-direction). The slide member 4222 is provided on an upper side of the rail member 4224 and is engaged with the rail member 4224 and is slidable in the cylinder row direction (Y-direction).

A connecting unit 4222a is provided on one end of the slide member 4222, and a tip end of the rod 421a is fixed to this connecting unit 4222a. When the rod 421a is advanced/retreated by driving of the actuator 421, the driving force is transmitted and the slide member 4222 is moved in the cylinder row direction (Y-direction).

Three link members 4223 are connected to one slide member 4222. The link member 4223 includes a perpendicular plate-shaped upper part fixed to the slide member 4222, a perpendicular plate-shaped lower part including an engaging unit 4223a, and a horizontal plate-shaped intermediate part connecting the upper part and the lower part. The engaging unit 4223a is a groove opened downward in this embodiment, and the lower part of the link member 4223 has a crab claw shape or a spanner shape. The engaging unit 4221a of the handle member 4221 is inserted into the engaging unit 4223a and is engaged therewith. As a configuration to the contrary, the engaging unit 4221a of the handle member 4221 may be replaced with a crab claw shape or a spanner shape, while the link member 4223 may be made a roller corresponding to the engaging unit 4221a.

A coupling structure between the link member 4223 and the slide member 4222 as well as the link member 4223 is not limited to the above-described configuration, and various configurations can be employed.

The opening/closing operation of the valve 412 by the opening/closing mechanism 42 will be described by referring to FIGS. 8A to 8C. FIG. 8A illustrates a state of the opening/closing mechanism 42 when the valve 412 is closed, for example. When the rod 421a advances by means of driving of the actuator 421, the slide member 4222 is slid to the Y-direction (left direction in FIG. 8A) and the three link members 4223 coupled to the slide member 4222 are moved in parallel in the Y-direction.

At this time, the engaging unit 4221a of the handle member 4221 is moved and guided along a groove of the engaging unit 4223a and moved to a depth side of the groove and as illustrated in FIG. 8B, the handle member 4221 is rotated around the operation unit 412a. In this way, the link member 4223 rotates the handle member 4221 around the shaft of the operation unit 412a in conjunction with sliding of the slide member 4222 and rotates the operation unit 412a. As a result, the valve element 412b is also rotated.

When the handle member 4221 is rotated in proportion with a slide amount of the slide member 4222, and the handle member 4221 is rotated by 90 degrees from a state in FIG. 8A, a state in 8C is brought about. At this time, the valve 412 is open. By retreating the rod 421a by driving the actuator 421, the state in FIG. 8C can be returned to the state in FIG. 8A. The three valves 412 are opened/closed at the same time in each bank.

In this way, in this embodiment, opening/closing of the valve 412 can be automated. The actuator 421 is arranged on one end portion side of the slide member 4222 in the cylinder row direction (Y-direction) and arranged on one end side in the disposition direction of the pipeline 411 away from the pipeline 411 and thus, its disposition space does not affect the pipeline lengths L1 and L2 (FIG. 3). Therefore, when a torque required for opening/closing of the valve 412 increases or higher durability is required in association with an increase in the number of opening/closing times, even if the size of the actuator 421 has to be increased, there is no need to consider an influence on the pipeline lengths L1 and L2, whereby freedom in design is improved.

As a result, as illustrated in FIG. 6, in this embodiment, the valve 412 and the pressure sensor 413 are configured to be adjacent to each other in a direction (horizontal direction, here) orthogonal to a longitudinal direction of the pipeline 411, and a configuration in which the pipeline lengths L1 and L2 (FIG. 3) become shorter is realized.

The transmission mechanism 422 has the handle member 4221 and the link member 4223 which are a peripheral configuration of the valve 412 constituted by plate-shaped members so as to reduce their dedicated spaces. Particularly, the link member 4223 is formed by bending the upper part, the intermediate part, and the lower part in a crank shape, and a portion adjacent to the valve 412 is only the lower part including the engaging unit 4223a. As a result, a configuration in which the handle member 4221 and the lower part of the link member 4223 are arranged in a gap (narrow space) between the valve 412 and the pressure sensor 413 is realized.

<Configuration of Exhaust Side>

The opening/closing mechanism 52 is different from the opening/closing mechanism 42 in a point that the number of valves to be opened/closed is one, but the other configurations can be the same. For example, the opening/closing mechanism 52 can have the handle member 4221 and the link member 4223 one each in the opening/closing mechanism 42, while the others can have the same configuration. If the collective exhaust port assumed in this embodiment is not employed but a plurality of the exhaust ports EP are configured to be provided on one bank, the opening/closing mechanism 52 can have the configuration similar to that of the opening/closing mechanism 42.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-066733, filed Mar. 27, 2014, which is hereby incorporated by reference herein in its entirety.

What is claimed is:

1. A testing unit configured to test a multi-cylinder engine including a plurality of ports including an intake port and an exhaust port in a pseudo driving state, comprising:
   a plurality of pressure inspection units; and
   at least one opening/closing mechanism,
   wherein each of said plurality of pressure inspection units includes:
   a pipeline connected to one of the plurality of ports; and
   a valve for opening/closing the pipeline,
   wherein the pipeline includes a mounting unit to which a sensor for detecting a pressure in the pipeline is mounted, the mounting unit being positioned between the valve and the intake port or the exhaust port;
   wherein said opening/closing mechanism includes:
   one actuator; and
   a transmission mechanism connected to the actuator and transmitting a driving force of the actuator to an operation unit of each of the plurality of valves to open and close the plurality of valves,
   wherein said transmission mechanism includes:
   a plurality of link members which is moved by the driving force, each link member including an engaging unit; and
   a plurality of handle members,
   wherein one end portion of each handle member is connected to a corresponding operation unit, and
   wherein the other end portion of each handle member is engaged with the corresponding engaging unit.

2. The testing unit according to claim 1, wherein each of the plurality of ports includes a plurality of intake ports;
   each pressure inspection unit of the plurality of pressure inspection units is provided on each intake port of the plurality of intake ports; and
   said opening/closing mechanism is provided on each cylinder row.

3. The testing unit according to claim 1, wherein
   the operation unit comprises a valve shaft, to which the one end portion of each handle member is connected,
   the transmission mechanism includes:
   a slide member slidable in a cylinder row direction,
   each link member is coupled to the slide member and rotating the handle member around the valve shaft in conjunction with slide of the slide member, and
   the actuator is arranged on one end portion side in a cylinder row direction of the slide member and urges the slide member in the cylinder row direction.

4. The testing unit according to claim 1, wherein each link member includes an upper part, an intermediate part and a lower part,
   each link member is formed by bending the upper part, the intermediate part and the lower part in a crank shape, and
   the lower part includes the engaging unit.

5. The testing unit according to claim 1, wherein the sensor is mounted to the mounting unit.

6. The testing unit according to claim 1, further comprising:
   a support unit configured to support the plurality of pressure inspection units; and
   a moving mechanism configured to move the support unit between an inspection position where the pipeline is connected to the port and a retreated position where the pipeline is spaced away from the port.

7. The testing unit according to claim 6, further comprising:
   a buffer mechanism provided between the support unit and the moving mechanism, wherein
   the buffer mechanism connects the support unit and the moving mechanism so that support unit can be displaced relative to the moving mechanism.

8. The testing unit according to claim 6, further comprising:
   an elevation mechanism configured to elevate up/down the support unit as the moving mechanism; and
   a buffer mechanism provided between the support unit and the elevation mechanism, wherein
   the buffer mechanism connects the support unit and the elevation mechanism so that support unit can be displaced relative to the elevation mechanism.

* * * * *